United States Patent [19]

Mazzei et al.

[11] 4,060,413
[45] Nov. 29, 1977

[54] METHOD OF FORMING A COMPOSITE STRUCTURE

[75] Inventors: Peter J. Mazzei, Jordan; Gerrit VanDrunen, Hamilton, both of Canada

[73] Assignee: Westinghouse Canada Limited, Hamilton, Canada

[21] Appl. No.: 694,927

[22] Filed: June 11, 1976

[30] Foreign Application Priority Data

Dec. 24, 1975 Canada .................................. 242605

[51] Int. Cl.² ............................................. B22F 3/00
[52] U.S. Cl. .................... 75/208 R; 75/229; 75/211; 75/226; 29/156.8 B; 416/230
[58] Field of Search .......... 75/211, 208, 226, DIG. 1, 75/229; 29/156.8 B; 416/230

[56] References Cited

U.S. PATENT DOCUMENTS

| | | | |
|---|---|---|---|
| 3,095,642 | 7/1963 | Lockwood | 75/DIG. 1 |
| 3,293,073 | 12/1966 | Doolittle et al. | 428/430 |
| 3,419,952 | 1/1969 | Carlson | 75/DIG. 1 |
| 3,600,103 | 8/1971 | Gray et al. | 416/224 |
| 3,731,360 | 5/1973 | Stone, Jr. | 29/156.8 |
| 3,751,271 | 8/1973 | Kimura | 75/200 |
| 3,762,835 | 10/1973 | Carlson et al. | 29/156.8 |
| 3,781,191 | 12/1973 | Jones | 75/DIG. 1 |
| 3,887,365 | 6/1975 | Sherfy | 75/214 |
| 3,994,722 | 11/1976 | Kaarlea et al. | 75/208 R |

Primary Examiner—Brooks H. Hunt
Attorney, Agent, or Firm—R. H. Fox; E. H. Oldham

[57] ABSTRACT

Composite turbine blades and vanes have been proposed in the past formed from nickel or cobalt base superalloys and reinforcing fibres such as tungsten, molybdenum, silicon carbide, or graphite. One of the problems has been the spacing of the fibres and arrangement within the form. The present invention provides for such arrangement by means of aligning the fibres on an alloy powder tape or cloth comprising powdered superalloy and an organic binder. Pieces of the tape are then cut in the desired shape and arranged within a mold and subsequently bonded into a consolidated shape.

9 Claims, 4 Drawing Figures

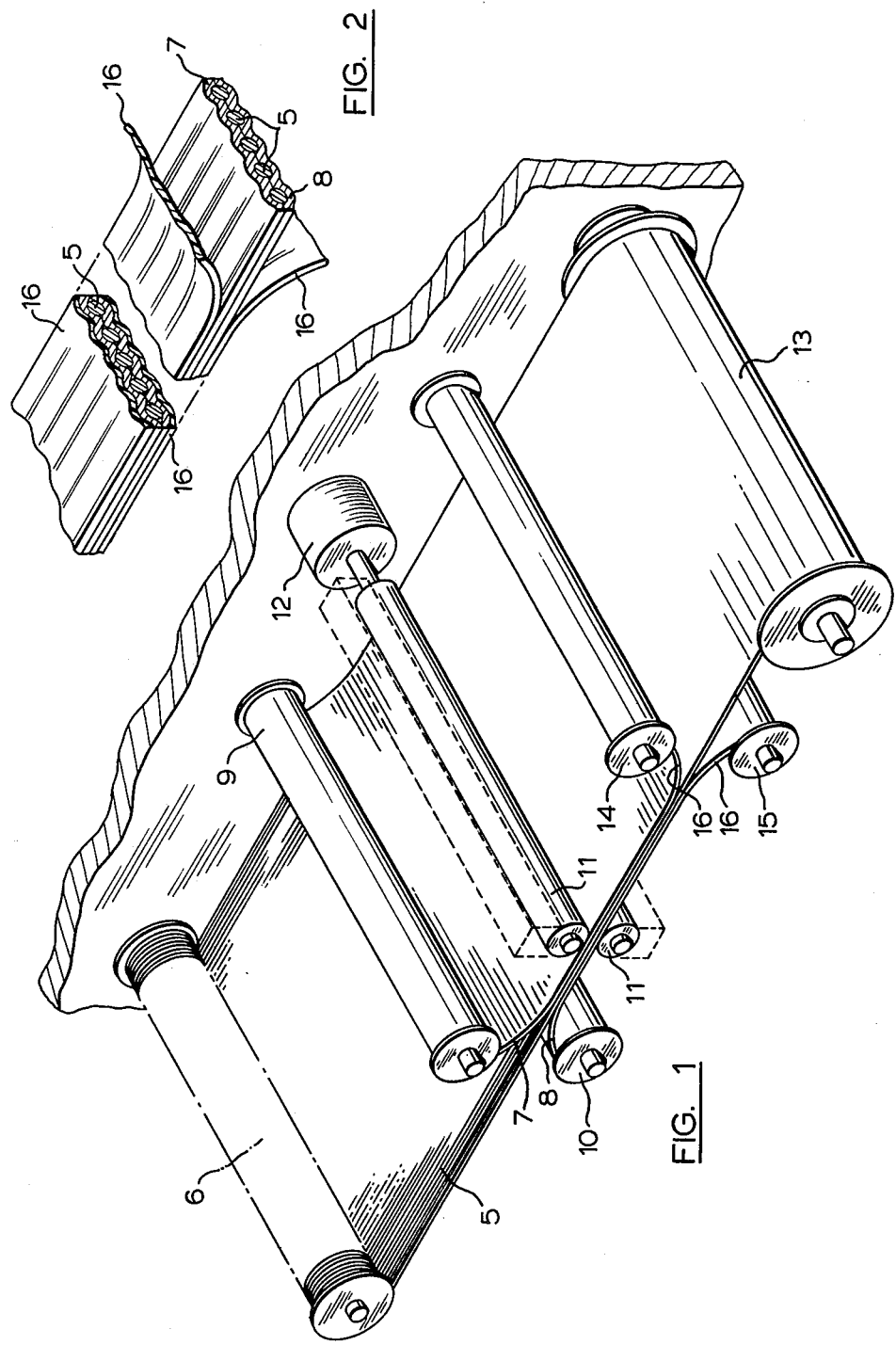

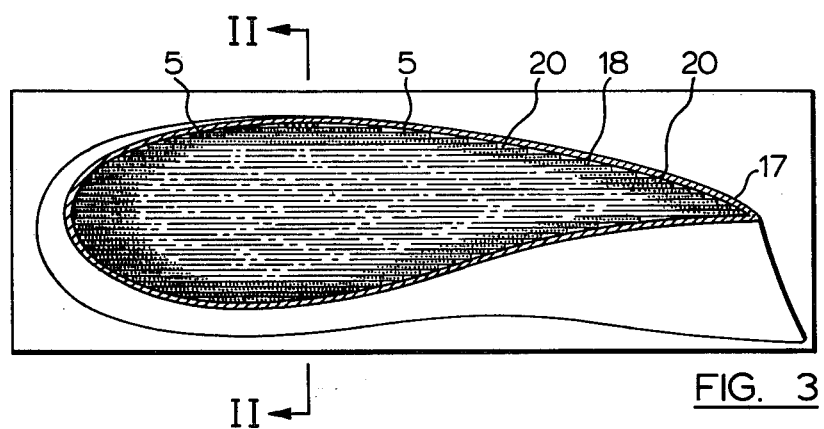
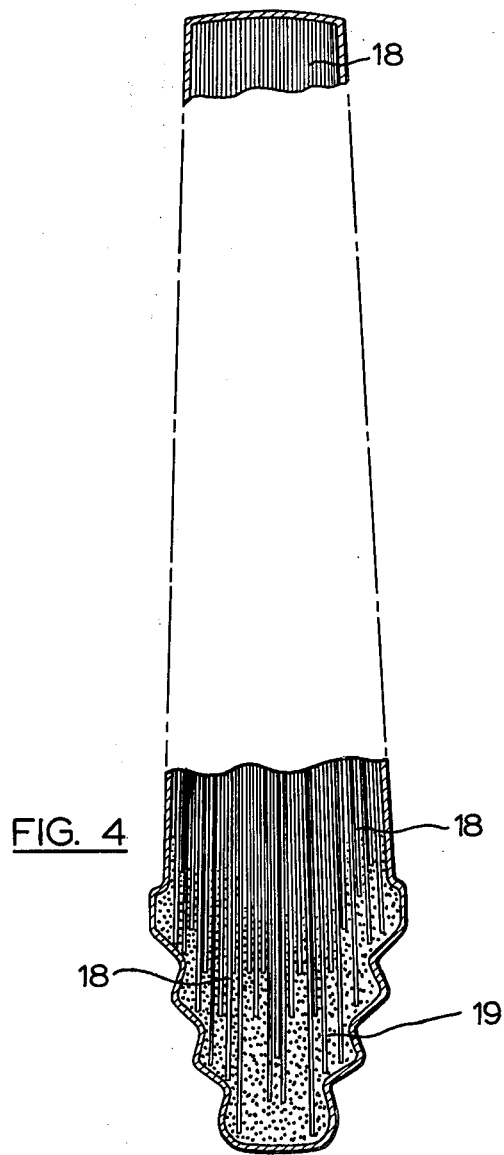

METHOD OF FORMING A COMPOSITE STRUCTURE

FIELD OF INVENTION

This invention relates generally to the manufacture of composite articles and more specifically to the manufacture of gas turbine components comprising a composite structure formed of a matrix material and reinforcing fibres giving the component high temperature strength and oxidation resistance.

DESCRIPTION OF THE PRIOR ART

Composite articles possessing desirable combinations of properties produced from the combination of the characteristics of a matrix material and embedded reinforcing fibres have become necessary in areas such as gas turbine blades and vanes because of the operating conditions. Gas turbine airfoils will have to be able to withstand temperatures as high as 1400° C. The ambient gases also will present corrosion and oxidation problems. In U.S. Pat. No. 3,129,069 a process is shown for counteracting this particular problem by producing aluminide coatings. U.S. Pat. Nos. 3,713,752 and 3,756,746 illustrate examples of composite structures which provide improved strength by introducing fibres into the airfoil.

A British Pat. No. 1,020,514 issued in 1966 describes a method of manufacturing a composite corrosion resistant article by arranging heat resistant fibres in a container and infiltrating the fibres with an alloy matrix. An alternate method of producing composite structures involves the preparation of tungsten fibre nickel base alloy materials by means of infiltrating the tungsten wires with a slip composed of nickel based alloy powder and a solution of ammonia salt of alginic acid in water. The composite is then dried, sintered and hot isostatically pressed. It will be seen however, that neither of these processes provide practical means for accurate spacing of the fibres in a complex shape and while the latter suggests arrangement of the fibres in wire screens, prior to infiltration, it is evident such a process would present real difficulty in a large scale commercial operation.

SUMMARY OF THE INVENTION

The present invention relates to a method for the manufacture of fibre reinforced composite articles by means of hot isostatically pressing, hereafter referred to as HIP, laminae consisting of fibres and superalloy powder. More specifically, the process involves arranging the fibres in a regular manner between layers of superalloy tape which consists of superalloy powder mixed with an organic binder to form a tape of predetermined thickness. Suitable laminae are cut from the tape and arranged in a shaped container. The container is then outgassed by evacuation and backfilling with hydrogen and heating at a controlled rate to a temperature sufficient to decompose the binder material and substantially remove it. Dry powder is added to fill the container and compacted by vibration. The container is evacuated, sealed and subjected to HIP producing a substantially coherent composite article. The resultant shape may then be further machined, formed or simply used depending on the accuracy obtainable and desired.

BRIEF DESCRIPTION OF THE DRAWINGS

For a better understanding of the nature and objects of the invention reference may be had to the following detailed description taken in conjunction with the accompanying drawings in which:

FIG. 1 is an isometric view of an apparatus for forming the tape fibre composite, FIG. 2 is a sectional view of the resultant composite tape, FIG. 3 is a sectional view of an airfoil laid up from sections of the tape, FIG. 4 is a view of an airfoil, partially in section, on Section II—II in FIG. 3 showing the disposition of fibres.

Considering first FIG. 1 there is shown a means of combining the fibres and tape for the purpose of this invention. The fibres consist of suitable reinforcing wire which may, for example, be tungsten, molybdenum silicon carbide, or graphite. These fibres may be coated with other materials such as a diffusion inhibiting layer in a manner described in copending Canadian Patent application No. 228,901 filed June 9, 1975 to M. Javid Hakim. The superalloy powder tape may be manufactured in a manner as described in U.S. Pat. No. 3,293,072 patented Dec. 20, 1966, Doolittle et al, where there is described a method of producing metallizing films used particularly in association with producing metallic coatings on ceramic surfaces. In the present case the metal may be finely divided superalloy powder having a size of minus 60 mesh. The alloys listed in Table 1 are those actually employed and are representative of a family of nickel and cobalt base alloys generically referred to as superalloys.

Table I

| Element | Percent of | |
|---|---|---|
| | Mar M-200 | HS-21 |
| Carbon | 0.02 | 0.25 |
| Chromium | 9.80 | 30.5 |
| Cobalt | 11.08 | Balance |
| Niobium | 1.02 | — |
| Aluminum | 5.23 | — |
| Titanium | 2.10 | — |
| Tungsten | 12.82 | — |
| Molybdenum | — | 5.5 |
| Zirconium | 0.05 | — |
| Nickel | Balance | 2.5 |

The powdered metal is mixed with a resin such as polymethacrylate and formed into a tape which may include a plastic backing layer 16. As shown in FIG. 1 the tungsten wires 5 are fed from creel 6. The fibres are sandwiched between two layers of the metallizing tape 7 and 8 which are fed from rolls 9 and 10. This composite structure is then rolled between rolls 11 which are driven by motor 12 and may be heated to facilitate plastic deformation of the tape. The resultant bonded sandwich is then accumulated on roll 13 and the backing layers 16 are accumulated on rolls 14 and 15.

As shown in FIG. 2 the sandwich consists of a layer of equally space fibres 5 and two layers of metallized tape 7 and 8 forming an essentially void free tape. A suitable form 17 having the shape indicated in cross-section FIG. 3 is then filled with laminae 18 cut from this tape with the fibres 5 running longitudinally through the airfoil, or at an angle if cross plying is required for off-axis strength, and projecting into the root 19 of the airfoil, as shown in FIG. 4, in a random fashion. The container 17 may be formed from any satisfactory sheet material, for example, aluminum-killed carbon steel may be adequate. There are, however, advantages to forming the container from a corrosion resistant alloy sheet which may then remain as a portion of the resultant blade while in the case of low carbon steel the container must be removed from the resultant piece. Other materials may also be used as will be explained later. The resultant laid-up airfoil in its container must now be outgassed. This is accomplished by evacuating the container and then filling it with hydrogen gas. The whole is then gradually heated up to 300° C, evacuated and backfilled with hydrogen again, and held at that temperature for a time sufficient to decompose the organic binder. The container is then heated up to 650° C. which is sufficient to remove all volatile material leaving only the fibres and the superalloy. The outgassing with hydrogen gas not only flushes out the decomposition products of the organic binder but may also provide further advantages. It appears, for example, that heating in a reducing atmosphere may reduce oxide on the surface of the superalloy particles and promote subsequent consolidation of the article.

More superalloy powder is now added to the container to fill in spaces 20 between the container and the ends of the laminae and also to fill the root section 19. The whole is compacted by vibration and a lid containing an evacuation tube is welded to the container. The container may be checked at this time for gas leaks by conventional techniques such as applying positive halium or argon pressure. The container is then evacuated and sealed and subjected to HIP. Hot isostatic compression for this material requires a working temperature of 900° C to 1300° C. and a pressure of 10,000 to 30,000 psi. The preferred temperature ranges are about 1025 centigrade to about 1250° C. The various HIP temperature and pressure parameters may be adjusted according to the chosen matrix alloy and fibre. The blade may now be removed and further processed as desired.

As previously indicated if the container 17 was made of low carbon steel it may be removed by a pickling process. If the container was made of a corrosion resistant alloy it will not be necessary to remove it. Any final shaping of the blade as is necessary may now be carried out. For example, if the variations from the desired shape are not too great the blade may be machined, but only to a degree that does not cause exposure of any of the fibres. The case where the container is made of corrosion resistant alloy is particularly advantageous for this process, since there is a surface layer of alloy that may be machined without danger of exposing any of the fibres. Exposure of any of the fibres may result in the wire being exposed to the hot ambient gas in the turbine which could result in rapid oxidation and destruction of the blade.

An alternate process may be utilized where the form of the airfoil is still unsuitable for the purpose due to limitations imposed by the manufacturing process. In this case the airfoil may be subjected to thermal mechanical processing by hot die forging. Components manufactured in accordance with the foregoing process may have a very good flow characteristic and the thermal mechanical processing may improve the stress rupture characteristics of the matrix material by changing the grain character.

If the blade is to be subjected to temperatures in excess of 1093° C. it may be necessary to provide additional protective coating for example an aluminide coating as produced by pack cementation or physical vapour deposition. Such a coating produces an alloyed nickel or cobalt aluminide surface which is extremely resistant to oxidation.

A further alternative method of forming the structure is to form the container from ceramic material in a manner similar to that used in the lost wax process by making a model of the airfoil in wax, coating the wax with a slip of ceramic in a multi-dip process, melting out the wax and firing the resultant slip casting. The remaining ceramic then becomes a suitable mold for forming the blade or vane. This mold may then be filled with fibre tape laminae as in the previous example, hydrogen outgassed and further filled with powdered superalloy. However, since the ceramic mold is porous and by itself not an evacuable container, it is placed in a metallic container and surrounded with suitable pressure transmitting medium such as silica sand. The container is sealed and the whole container is then evacuated and subjected to HIP. After HIP processing the silica material can be removed from the sealed container and the blade or vane removed from its ceramic mold by mechanical methods such as vibration, tumbling, hammering or grit blasting. It has been found that the ceramic material may contaminate the superalloy by creating oxides on the outside surface. Under these circumstances it may be necessary to oversize the blade and remove the oxide layer by subsequent machining or etching etc.

As is indicated in FIG. 4 the ends of the fibres 5 must be arranged in such a manner as not to produce undue stress concentrations within the root of the blade. To that end it may be advisable to random length the fibres as shown so that they may intrude various distances into the root, or alternatively the fibres may be cut to various specific lengths to promote the proper distribution of stress.

While our invention has been described and exemplified in association with gas turbine blades, vanes or airfoils it will be understood that composite structures may have various applications both in the field of gas turbines and otherwise. In various forms our invention may find use wherever conditions require a component having adequate strength at high temperatures. A typical example of an alternate application would be in the manufacture of thrust reversers for aircraft jet engines where such composite structures can provide adequate strength, even at high temperature, with reduced cross section and weight.

When the process involves the use of a ceramic mould, as described above, various materials may be used as a pressure transmitting medium. Generally materials in particulate form which neither solidify nor melt during the process are desirable. In addition the material must flow but not react with any of the materials it contacts nor volatilize at the pressure and temperature involved. Metallic halide salts such as sodium chloride and barium fluoride may be suitable for some applications.

The embodiments of the invention in which an exclusive property or privilege is claimed are defined as follows:

1. A method of forming a composite article of specific shape formed from matrix material and reinforcing fibres comprising forming a flexible plastic tape including said matrix material in powdered form and a flexible plastic decomposable binder, arranging a plurality of continuous parallel fibres on the surface of said tape, embedding said fibres in said tape by heat and pressure or by applying a second layer of tape matrix material cutting from the resulting tape a plurality of laminae of suitable shape, arranging said laminae in a container in such a manner as to form said specific shape, subjecting said laminae to heat and outgassing to remove said decomposable binder and subjecting said laminae and container to heat and pressure to bond said matrix material and fibres into a substantially void free coherent composite article.

2. A method of forming a composite article as claimed in claim 1 wherein said laminae are arranged in said form within a container and the remaining space in said container is filled with matrix material in powdered form.

3. A method of forming a composite article as claimed in claim 2 wherein said container is subjected to heating, outgassing and evacuation prior to subjecting the laminae to pressure to bond the laminae into a composite article.

4. A method of forming a composite article as claimed in claim 3 wherein said container is subjected to hot isostatic pressing at a temperature and pressure sufficient to produce a substantially coherent composite article.

5. A method of forming a composite article as claimed in claim 2 wherein said container is subsequently removed from said article.

6. A method of forming a composite article as claimed in claim 2 wherein said container is retained to constitute a part of the resulting composite article.

7. A method of forming a composite article as claimed in claim 2 wherein said container is a frangible ceramic container which is supported within a metallic container and totally surrounded therein by a suitable pressure transmitting medium prior to subjecting said container to heat and pressure.

8. A method of forming a composite article formed from a matrix of superalloy and metallic fibres selected from the class of tungsten, molybdenum, silicon carbide and graphite fibres, comprising forming a flexible tape consisting of powdered superalloy and a plastic organic material, arranging a plurality of continuous parallel fibres between two layers of said tape, bonding the tape and fibres into a substantially void free composite tape, substantially filling a metallic container with laminae cut from said composite tape, heating and outgassing said container to decompose and remove said organic material, flushing said heated container with hydrogen gas, filling any remaining space in said container with powdered superalloy, evacuating said container and subjecting said container to hot isostatic pressing sufficient to form a coherent composite article.

9. A method as claimed in claim 8 including the additional step of subsequently shaping said coherent composite article to the desired final shape without thereby exposing any of the included fibres.

* * * * *